United States Patent [19]

Tamiya

[11] Patent Number: 5,499,096
[45] Date of Patent: Mar. 12, 1996

[54] OPTICAL INSTRUMENT AND MEASUREMENT FOR MEASURING DISPLACEMENT OF SCALE USING DIFFERENT ORDER DIFFRACTION OF A DIFFRACTION GRATING

[75] Inventor: Hideaki Tamiya, Yamato, Japan

[73] Assignee: Sony Magnescale Inc., Tokyo, Japan

[21] Appl. No.: 227,128

[22] Filed: Apr. 13, 1994

[30] Foreign Application Priority Data

Apr. 13, 1993 [JP] Japan ............................. 5-086362

[51] Int. Cl.$^6$ ........................................... G01B 9/02
[52] U.S. Cl. ........................................... 356/356; 356/351
[58] Field of Search ........................................ 356/351, 356, 356/358

[56] References Cited

U.S. PATENT DOCUMENTS

| | | | |
|---|---|---|---|
| 4,970,388 | 11/1990 | Nishimura et al. | 250/237 G |
| 4,979,826 | 12/1990 | Ishizuka et al. | 356/356 |
| 5,035,507 | 7/1991 | Nishioki et al. | 356/356 |
| 5,120,132 | 6/1992 | Spies et al. | 356/356 |
| 5,258,861 | 11/1993 | Tsuchiya | 356/356 |

FOREIGN PATENT DOCUMENTS

| | | |
|---|---|---|
| 47-10034 | 5/1972 | Japan . |
| 63-75518 | 4/1988 | Japan . |
| 2-85715 | 3/1990 | Japan . |
| 4-130220 | 5/1992 | Japan . |

OTHER PUBLICATIONS

"Van Nostrand's Scientific Encyclopaedia", 1968, p. 525.

*Primary Examiner*—Samuel A. Turner
*Assistant Examiner*—Robert Kim
*Attorney, Agent, or Firm*—Foley & Lardner

[57] ABSTRACT

In an instrument and method for optically measuring a displacement of a scale which can achieve the noise elimination of returning light to a coherent light source, the scale and optical system are so constructed that an intersecting point of light fluxes radiated from the coherent light source and split into those fluxes by means of a first beam splitter is not present on a transmitting type diffraction grating and the incident lights (d, e) on a reflecting plate and the reflected lights (f, g) from the reflecting plate have no common use of the same light paths.

13 Claims, 6 Drawing Sheets

OPTICAL INSTRUMENT AND MEASUREMENT FOR MEASURING DISPLACEMENT OF SCALE USING DIFFERENT ORDER DIFFRACTION OF A DIFFRACTION GRATING

BACKGROUND OF THE INVENTION

1. Field of the Invention

The present invention relates to an optical instrument and optical method for measuring displacement of a scale. The present invention particularly relates to the optical instrument and method for measuring a position and/or velocity of a mobile body.

2. Description of Background Art

Japanese Patent Application First Publications No. Showa 47-10034 (United States Patent Application Ser. No. 73, 791 filed on Sep. 21, 1970) published on May 22, 1972, No. Showa 63-75518 published on Apr. 5, 1988, and No. Heisei 2-85715 published on Mar. 27, 1990 exemplify previously proposed optical displacement measuring apparatuses which detect positional changes of moving diffraction gratings utilizing interferences in light.

In each of the previously proposed optical displacement measuring apparatuses, a light flux (beams) radiated from a coherent light source is split into two light fluxes by means of a beam splitter, the two light fluxes are advanced through respectively separate light paths and incident on a diffraction grating constituting a scale, and generated diffraction lights thereon in an m order (m denotes 1 or larger integer) are obtained, and these two m-order diffracted light are recombined and a diffraction fringe of the recombined light flux is detected.

A light source and optical detector are of transmission types in which they are on opposite sides of the scale and of reflection types in which they are in the same positions with respect to the scale.

In general, a volume type hologram is used as the diffraction grating for the transmitting type application. Especially, if the optical parts are arranged such as to satisfy a bragg condition, a signal having a high output and high resolution can be derived.

However, since the transmitting type requires the arrangements of the light source and detector such that they are disposed in mutually opposite positions to a scale, the compact optical displacement apparatus cannot be achieved.

On the contrary, since the reflecting type requires the arrangements of light source and detector on the same positions to the scale, it is suitable for compacting the optical displacement instrument but it is difficult to achieve a high resolution instrument.

With such a tradeoff as described above in mind, an optical displacement measuring instrument having the advantages of both the transmitting type with those of the reflecting type may be considered. However, conventional problem attempts incurring in a that the adjustments of positions of the optical parts become very difficult.

FIG. 1 shows another previously proposed optical displacement instrument (encoder) disclosed in a Japanese Patent Application First Publication No. Heisei 4-130220 published on May 1, 1992.

In FIG. 1, the light beam (light flux) radiated From the light source 901 is incident on a first diffraction grating 902 passing through a corimeter lens 911, a beam splitter 903, and λ/4 plate 912. At this first diffraction grating, 902 the light beam is split into the two beams, receiving the diffraction at a second diffraction grating 906 forming the scale surface. The diffracted lights are incident vertically on a reflected plane 907. The reflected lights therefrom return to the original light path and are again made incident on the second diffraction grating 906.

The diffracted light diffracted by the second diffraction grating 906 is further returned to the original light path and again incident in the first diffraction grating 902. The combined light flux is returned to the beam splitter 903 and deflected toward an photo detector 904.

As described above with reference to FIG. 1, the light fluxes present between the diffraction grating 906 and reflecting plane 907 are vertical on the reflecting plane 907, i.e., the light fluxes are reciprocated in tile vertical direction as viewed from FIG. 1. Thus, the alignment adjustment between a reading optical system first diffraction grating 902 and the scale side second diffraction grating 906 is easy.

SUMMARY OF THE INVENTION

It is an object of the present invention to provide an optical displacement measuring instrument and method in which a problem of noise which has been caused by returning light fluxes toward a coherent light source is eliminated and which can achieve a more compact construction of the optical displacement measuring instrument.

According to one aspect of the present invention, there is provided with an instrument of optically measuring a displacement of a scale, comprising: a) a coherent light source; b) a transmission type diffraction grating satisfying a bragg diffraction condition; c) first beam splitting means for receiving a light flux radiated from the light source, transmitting a part of said light flux, and for reflecting the remaining part of said light flux, said first beam splitting means being arranged such that the split light fluxes are incident on said diffraction grating through approximately equal angles in their absolute values; d) light reflecting means arranged such that both light fluxes transmitted through the diffraction grating are again incident on the same diffraction grating, said light reflecting means and said diffraction grating constituting the scale; e) second beam splitting means arranged in a vicinity of a point at which both light fluxes again incident on the diffraction grating and passed through said diffraction grating are intersected; and f) photo-electric transducing means for detecting an interference state of both light fluxes combined by means of said second beam splitting means and outputting a signal indicative of the interference state.

According to another aspect of the present invention, there is provided with an instrument for optically measuring a displacement of a scale, comprising: a) a coherent light source; b) a first beam splitter which is so constructed as to split a light flux radiated from said light source into two light fluxes; c) a light transmitting type diffraction grating on which the split respective light fluxes are incident through approximately mutually equal angles in their absolute values; d) a light reflecting plate which is disposed approximately parallel to a surface of the diffraction grating so that the respective light fluxes transmitted through the diffraction grating are again incident on the same diffraction grating, said light reflecting plate and diffraction grating constituting said scale; e) a second beam splitter disposed in the vicinity to a point at which both light fluxes are intersected, both light fluxes being again incident on the diffraction grating and being passed through said diffraction grating; and f) a detector which detects an interference condition of the light fluxes coupled by said beam splitter.

According to still another aspect of the present invention, there is provided with a method for optically measuring a displacement of a scale, comprising the steps of: a) radiating a coherent light; b) providing a transmitting type diffraction grating and light reflecting means constituting the scale; and c) detecting an interference state of light fluxes passed through the diffraction grating at their intersecting point, wherein the light flux of the coherent light is split into two light fluxes, both light fluxes having twice passed through said diffraction grating, respectively, one of the light fluxes being incident and transmitted through the diffraction grating at the first time and being incident and diffracted at the second time in an m order (m denotes 1 or larger integer) and the other light flux being incident and diffracted in the m order through said diffraction grating at the first time and being incident and transmitted through the diffraction grating at the second time, these light fluxes having mutually the same light path lengths, a relationship between a grating pitch p of the diffraction grating, a wavelength $\lambda$ of the coherent light, and each incident angle $\theta$ of the coherent light on the diffraction grating is established as $2p \sin\theta = n\lambda$ ( n denotes an integer), the intersecting point of both light fluxes is not present on the diffraction grating, and the incident light flux and the reflected light flux to the light reflecting means having no common use of the same light path.

DESCRIPTION OF THE PREFERRED EMBODIMENTS

Before explaining preferred embodiments of the optical displacement measuring instrument and method, disadvantages of the encoder shown in FIG. 1 and disclosed in the Japanese Patent Application First Publication No. Heisei 4-130220 published on May 1, 1992 will be explained below.

Figure 1:
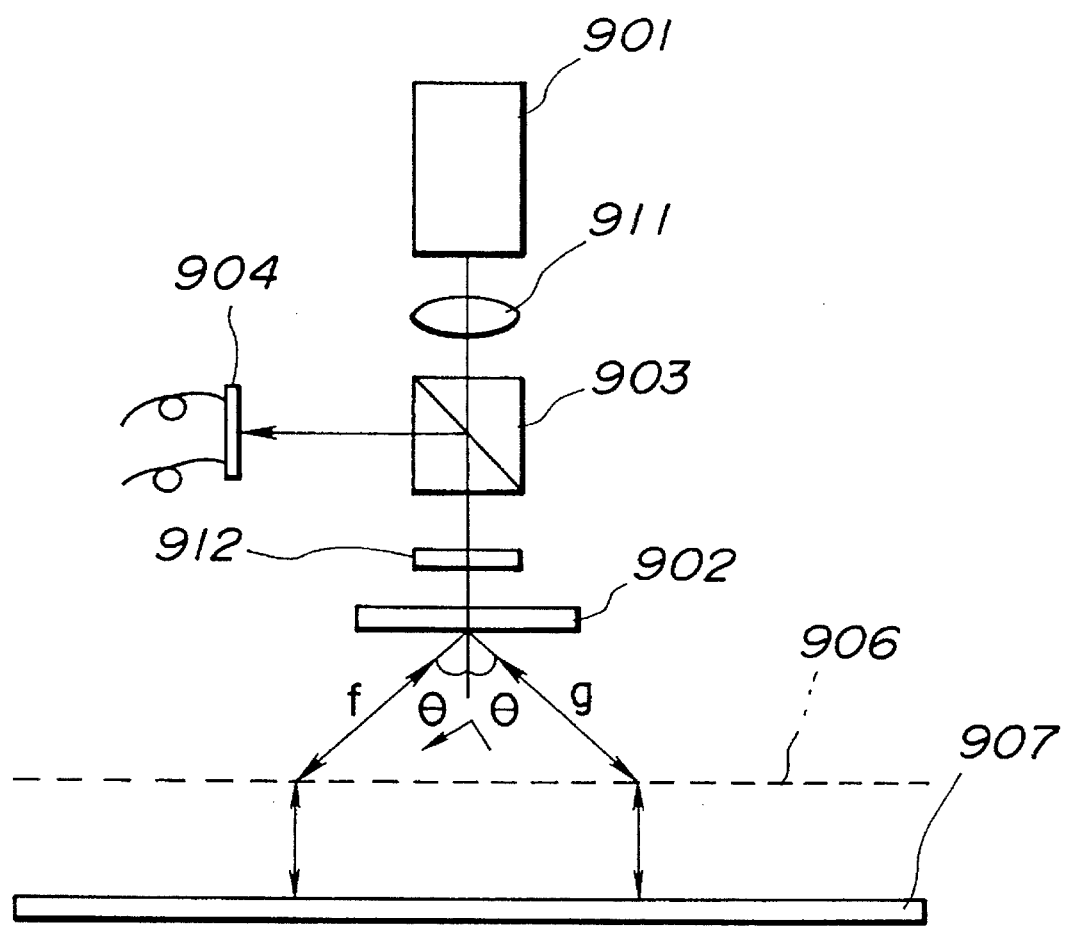
FIG. 1 is an explanatory view of an optical displacement measuring instrument disclosed in a Japanese Patent Application First Publication No. Heisei 4-130220 published on May 1, 1992.

The optical displacement measuring apparatus shown in FIG. 1 cannot inherently adopt a volume type hologram to carry out a bragg diffraction and the light fluxes pass the diffraction grating surfaces 902, 906 as a total of four times so that a high output signal cannot be achieved.

In addition, when, as shown in FIG. 1, the light fluxes f and g are returned to the original paths being reflected by means of the reflected film 907 and become again incident on the first diffraction grating 902, a part of the light fluxes transmits through the first diffraction grating 902 toward the beam splitter 903 and the other part of the light fluxes is reflected on the plane of the first diffraction grating 902. The light beam g in FIG. 1 is inserted and mixed toward the side f and the other light beam is inserted and mixed toward the side g, respectively. Thus, a good quality signal cannot easily be obtained. Since the incident light flux and reflected light flux with respect to the reflecting film 907 use commonly the same light path, a returning light to the coherent light source becomes easy to be generated.

It is noted although the returning light can be prevented from entering the coherent light source using a polarizer so as to reduce the effect of the returning light on the coherent light source, the complete elimination of the returning light is difficult.

When the detection signal has been resolved electrically with a higher resolution in the future of a super precision measurement field, such a slight effect of the returning light on the coherent light source may become a major problem.

FIGS. 2 through 9 show preferred embodiments of an optical displacement measuring apparatus according to the present invention.

Figure 2:
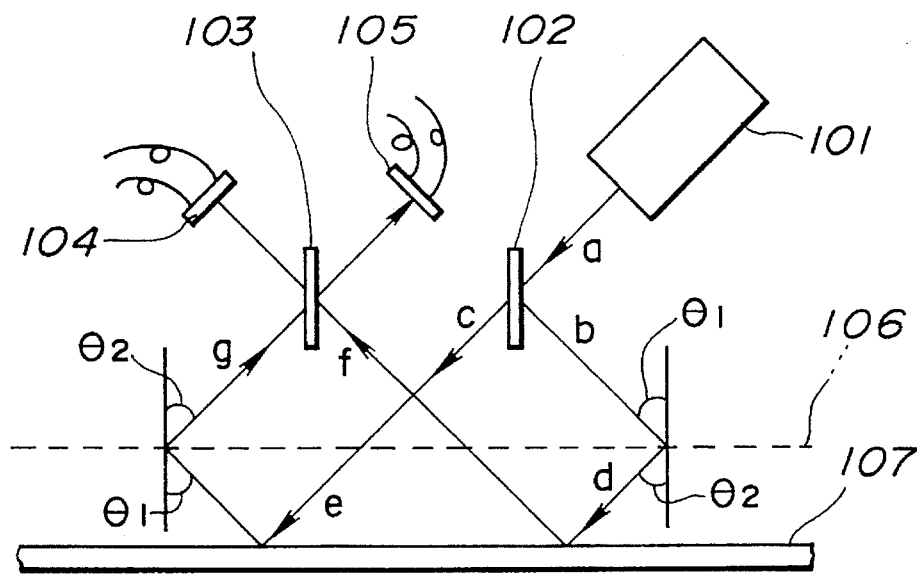
FIG. 2 is an explanatory view of an optical displacement measuring instrument in a first preferred embodiment for explaining a light path setting condition.

FIG. 2 shows a first preferred embodiment of the optical displacement measuring apparatus according to the present invention.

A light flux a radiated from a coherent light source 101 is split into two light fluxes b, c by means of the beam splitter 102. The two light fluxes b, c are incident on a grating surface 106 through mutually same angles $\theta_1$. The one light flux b becomes the diffracted light d in the m order (m denotes 1 or larger integer) and the other light flux c becomes a transmitted light (0 order light) e.

It is noted that, at this time, a relationship between a grating pitch p, a wavelength $\lambda$ of the coherent light, and an incident angle $\theta_1$ on the grating surface is fulfilled with a bragg condition, i.e., $2p\sin\theta_1 = m\lambda$ (m denotes an integer).

When such a diffraction as described above fulfills this condition, the relationship between the incident angle $\theta_1$ of the light flux onto the grating surface 106 and the radiated angle $\theta_2$ of the light flux passed through the grating surface is expressed as :

$$|\theta_1| = |\theta_2|.$$

The respective light fluxes passed through the diffraction grating 106 are reflected on a reflecting plate 107 and again are incident on the diffraction grating 106. At this time, the diffracted light d is not diffracted on the incident of the diffraction grating at the second time and serves as the diffraction transmittal light f.

On the other hand, the transmitted light e is diffracted when becoming incident on the diffraction grating 106 at the second time and becomes transmitted diffracted light g. These two light fluxes f and g are incident on the same point on the beam splitter 108 and are combined together. A part of the combined light flux is directed toward the detector 104 and the other part thereof is directed toward the detector 105 with the phase difference of 90.

According to the optical displacement measuring instrument in the first embodiment, the two light path lengths from a time when the two light fluxes b and c are split by means of the beam splitter 102 to a time when the light fluxes b and c are recombined by means of the beam splitter 103 are approximately equal. Therefore, the coherent light source such as a semiconductor laser can be used.

In addition, since the incident light fluxes and reflected light fluxes with respect to the reflecting plate 107 make no common use of the same light path and an intersecting point between the respective light fluxes is not present on an interface between the diffraction grating 106 and/or an interface of an index of refraction of the scale, a possibility of generating the returning light onto the coherent light source 101 is very small. Hence, a detection signal having a good quality and having almost no noise present due to the returning light can be derived.

If a volume type hologram as will be described later is used for the diffraction grating 106, a diffraction grating efficiency can be enhanced since the bragg condition is fulfilled.

In the first embodiment, it is preferable to have the diffraction grating efficiency of 50% and it is easy to fabricated such a hologram having the diffraction efficiency.

Figure 3:
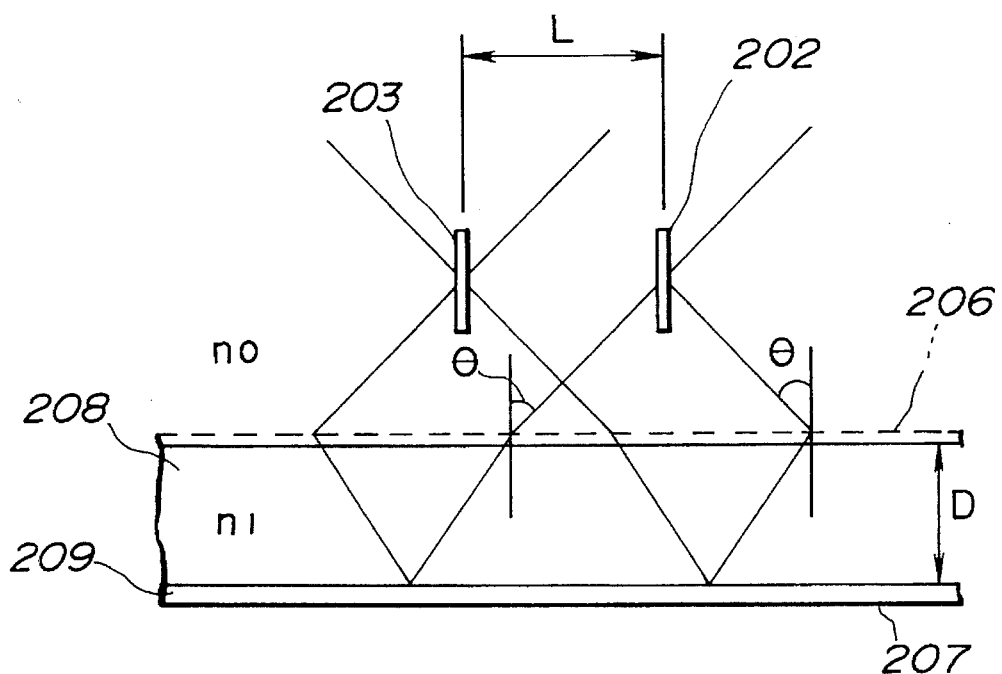
FIG. 3 is a schematic configuration view of the first preferred embodiment of the optical displacement measuring apparatus according to the present invention.

Dimensions of the scale and detection optical system are selected as appreciated from FIG. 3.

Suppose that a spatial distance from the diffraction grating 206 to the reflecting film 207 is D, the index of the refraction therebetween is $n_1$, an index of the refraction of air is $n_0$, and incident angle of the coherent light is θ, a relationship of a spatial distance between these values and beam splitters 202, 203 is selected as:

$L=2D \tan(\sin^{-1}(n_0 \sin θ/n_1))$.

Next, a specific construction of the first preferred embodiment of the optical displacement instrument according to the present invention will be described with reference to FIG. 4.

Figure 4:
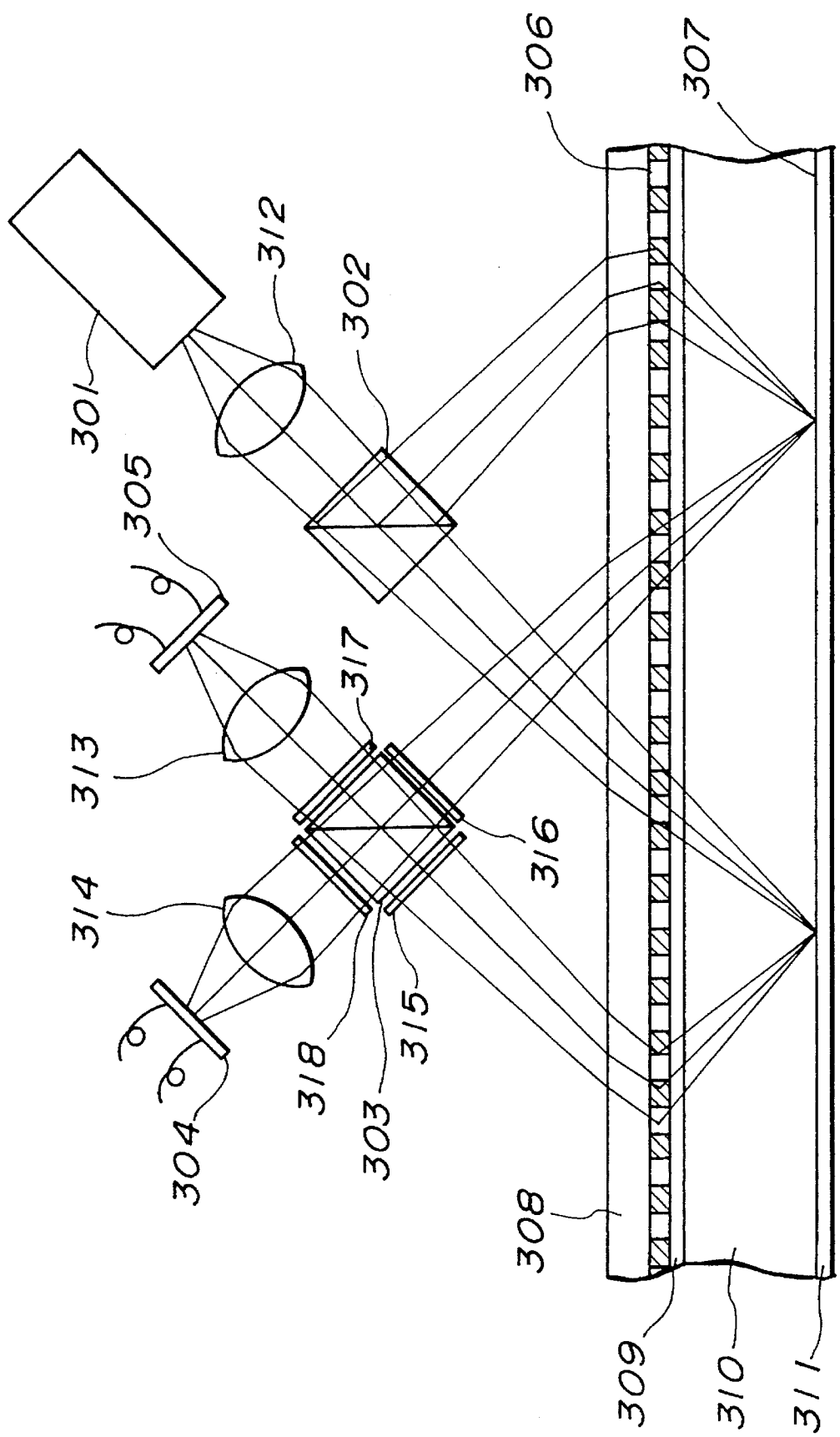
FIG. 4 is a schematic configuration view of an optical displacement measuring instrument in the first preferred embodiment of the optical displacement measuring instrument.

In FIG. 4, the coherent light source shown in FIG. 2 is constituted by the semiconductor laser light source 301. In addition, convexity lenses 312, 313, and 314 are installed in the vicinities of the semiconductor laser light source 301 and of detectors 304 and 305, respectively. Triangle shaped bodies in FIG. 4 constitute λ/4 plates (λ denotes a wavelength). In FIG. 4, numerals 317 and 318 denote polarization plates, numeral 304 denotes a sinusoidal wave photo detector, and numeral 305 denotes a cosin wave photo detector. In addition, in FIG. 4, numeral 308 denotes a hologram glass substrate, numeral 306 denotes the volume type hologram, numeral 309 denotes an adhesive layer, numeral 310 denotes a sealing glass substrate, and numeral 307 denotes a reflecting film.

It is noted that each of the glass substrate 308, the hologram 306, the adhesive layer 309, the sealing glass substrate 310, and reflecting film 307 is provided with an index mark so as to align each component of the scale by means of an index matching.

In FIG. 4, the laser beam (laser light) radiated from the semiconductor laser light source 301 is collected by means of the convexity lens 312 and is split into the two light beams by means of the first beam splitter 302. The beams split thereby are respectively radiated into a plane of the hologram 306 as beam spots. The beams passed through the plane of the hologram 306 are focused on the reflecting film 307. The reflected beams form divergence light beams and pass again through the plane 306 of the hologram 306. The one beam passes λ/4 plate 315 and the other beam passes λ/4 plate 316 to become incident on the second beam splitter 303.

The two polarizers 318 and 317 extract 0 directional component (cosin wave) and 90° directional component (sine wave) from the light beam combined at the second beam splitter 303. The convexity lenses 304 and 305 collect the cosin and sine components of light beam on the photo detectors 304 and 305, respectively.

Figure 5:
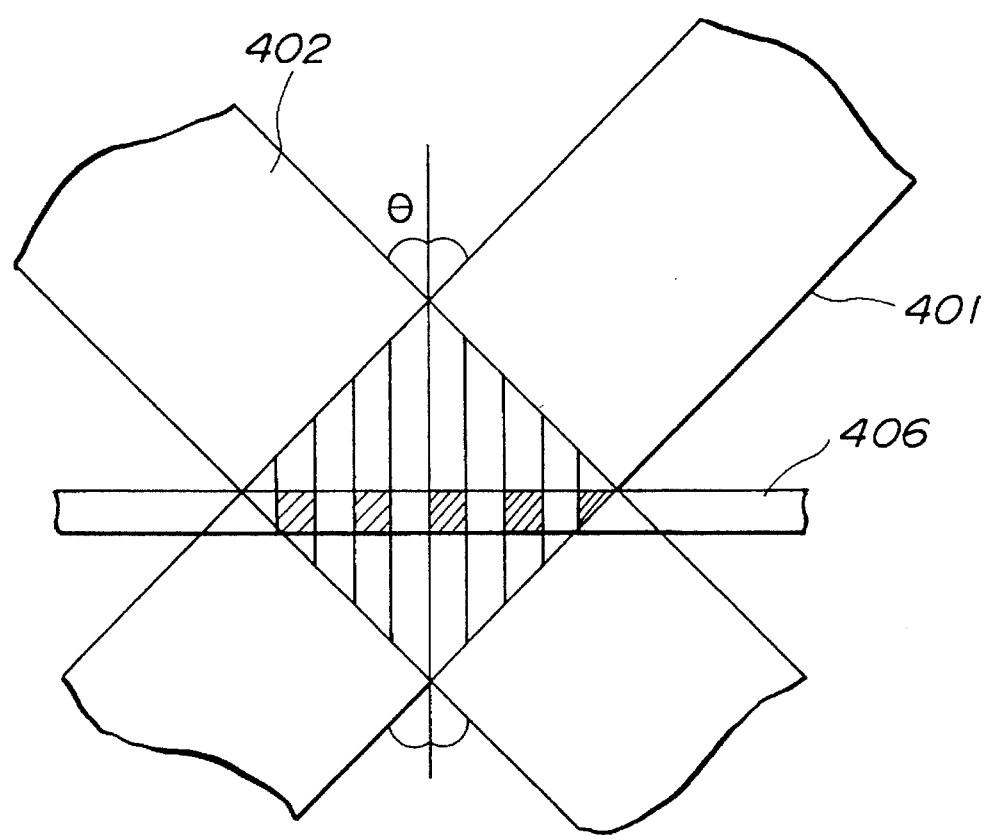
FIG. 5 is an explanatory view how to prepare a hologram.

FIG. 5 shows a part of a volume type hologram (volume type holograhic grating) used in the embodiment shown in FIG. 4.

To fabricated the holograhic grating, as shown in FIG. 5, coherent plane waves 401 and 402 are incident on a recording material 406 through angels θ, respectively, so that an interference fringe of both plane waves is formed and recorded on the recording material 406.

The thus fabricated holographic grating 406 has a grating plane vertically positioned to the surface of the hologram. Therefore, since the change in the grating pitch is minor which is caused by the change in the material during the process of fabricating the hologram, the fabrication of the scale becomes easier.

In addition, since the selection of the photosensitive material permits the fabrication of the hologram scale with a high diffraction efficiency, the hologram scale having approximately 50% of the diffraction efficiency used according to the present invention can easily be achieved.

Figure 6:
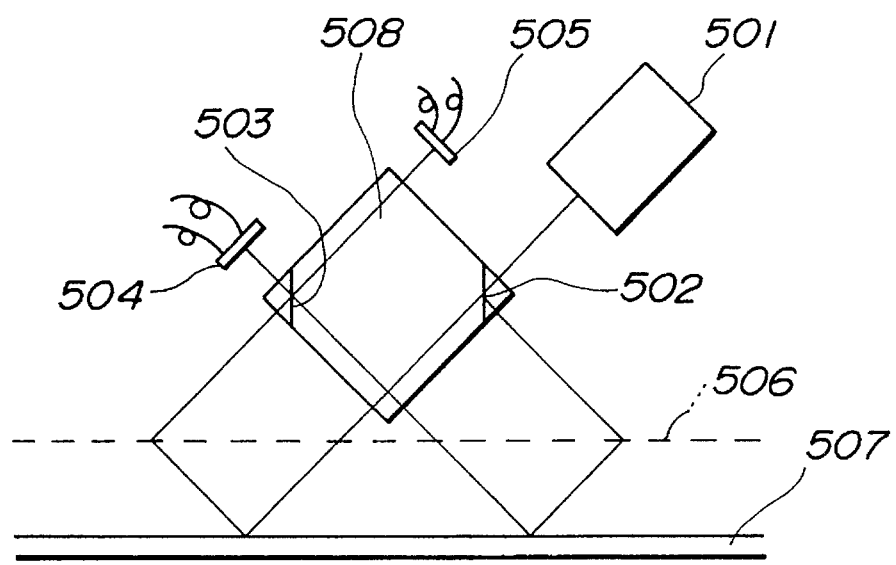
FIG. 6 is an explanatory view of the optical displacement measuring apparatus in a second preferred embodiment according to the present invention.

Next, FIG. 6 shows a second preferred embodiment of the optical displacement measuring instrument according to the present invention.

A detailed explanation of the detection optical system is omitted here since it is the same as that shown in FIGS. 2 and 4.

Although the optical system in the second embodiment is principally the same as that explained in the first embodiment, an integrated type of beam splitters is used in the second embodiment.

As shown in FIG. 6, two planes (outer surfaces) 502 and 503 of a prism 508 constitute the two beam splitters 502 and 503. An adjustment of a distance L between the two beam splitters, as shown in FIG. 3, is not necessary in the second embodiment and the number of parts becomes accordingly reduced.

Figure 7:
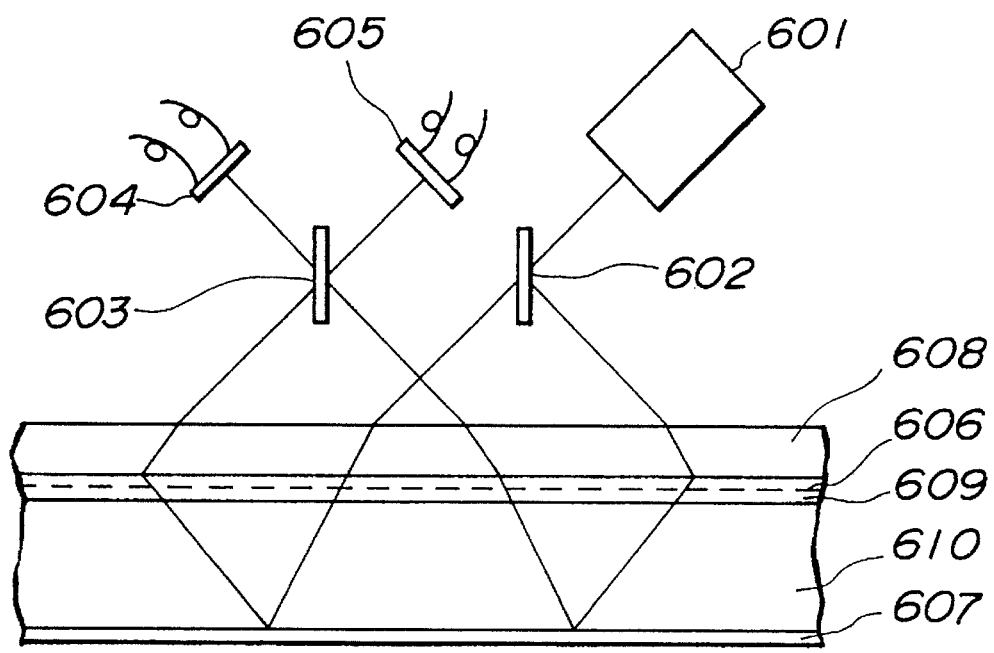
FIG. 7 is an explanatory view of the optical displacement measuring apparatus in a third preferred embodiment according to the present invention.

FIG. 7 shows a third preferred embodiment of the optical displacement measuring apparatus.

The scale in the third embodiment is constituted by a hologram glass substrate 608, the volume type hologram 606, the adhesive layer 609, the sealing glass substrate 610, and the reflecting film 607.

The detection optical system is the same as that in the first embodiment and, therefore, the detailed description thereon will be omitted herein.

In the scale of the third embodiment, the sealing glass substrate 610 of the hologram serves as a light reflecting plate. Therefore, since the spatial distance between the volume type hologram 606 and reflecting film 607 is maintained constant, a stable detection signal can be achieved even if the spatial distance between the detection optical system and scale is varied.

Figure 8:
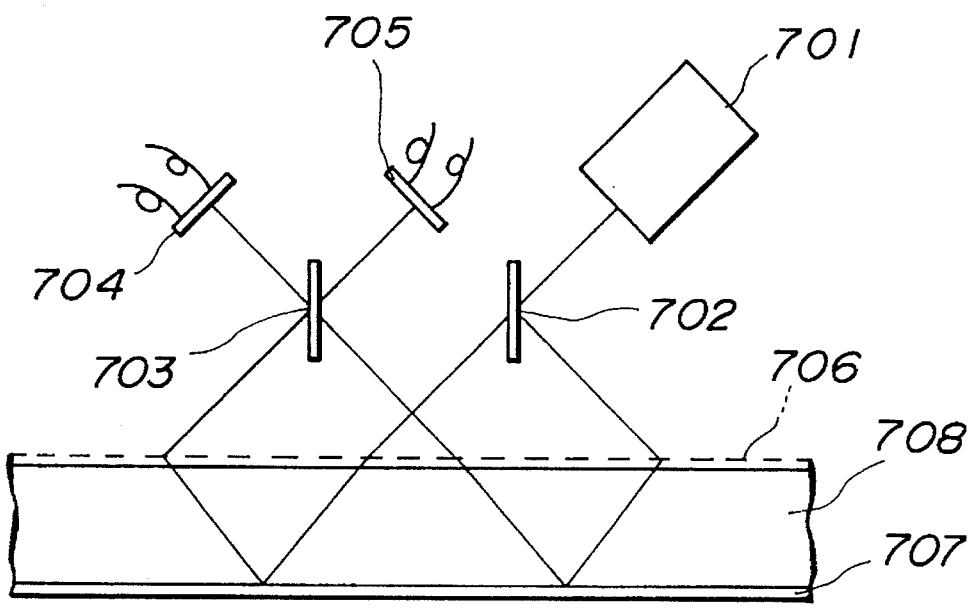
FIG. 8 is an explanatory view of the optical displacement measuring apparatus in a fourth preferred embodiment according to the present invention.

FIG. 8 shows a fourth preferred embodiment of the optical displacement measuring apparatus according to the present invention.

In the fourth embodiment, for the scale, such a scale that the grating glass substrate 708 becomes thick and a reflecting film 707 is formed on a rear surface of the grating glass substrate 708 is used.

Hence, the thickness of the whole scale becomes thinner then that shown in FIG. 7 and the instrument can be compacted.

The distance between the grating 706 and the reflecting film 707 is determined according to a thickness of the glass substrate 708 so that the scale becomes uniform and accuracy of the scale can be improved.

Although, in the first, second, third, and fourth embodiments, the detection optical system is described with one of the diffracted light beams generated on the diffraction grating plane taken into consideration, the diffracted light is actually provided in the ± m order so that the detection optical system is constructed with −m order diffracted light taken into consideration.

Figure 9:
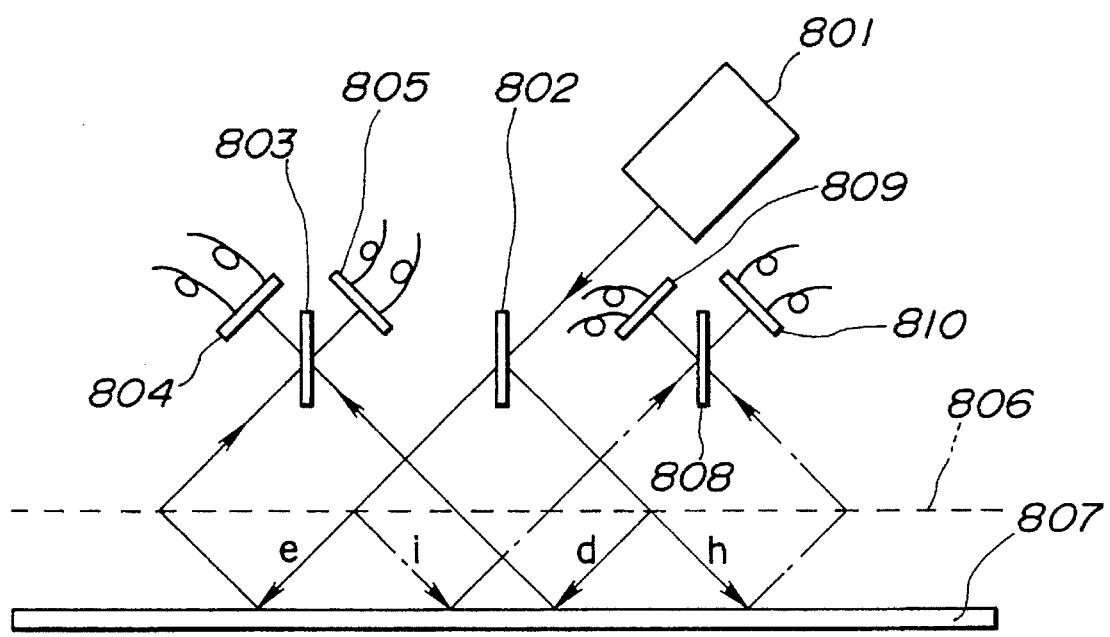
FIG. 9 is a schematic configuration view of the optical displacement measuring apparatus in a fifth preferred embodiment according to the present invention.

A fifth embodiment of the optical displacement instrument according to the present invention shown in FIG. 9 indicates the −m order diffracted light.

As shown in FIG. 9, the light flux radiated from the light source is split into two light fluxes by means of the beams splitter 802 and the split light fluxes are incident on the diffraction grating 806, respectively.

From among the diffracted lights generated on the diffraction grating 806, the diffracted lights d and e which are directed toward the leftward direction as viewed from FIG. 9 are detected by means of the photo detectors 804 and 805 via the same light paths as those shown in FIG. 2.

It is noted that since the other light fluxes than those d and e are directed toward the rightward direction as viewed from FIG. 9 are present in the diffraction grating 806, those other light fluxes are detected by means of the photo detectors 809 and 810.

Since the light receiving sections have two number of photo detectors in the fifth embodiment, the output of the detected signal becomes twice. In addition, although faults are found on the reflecting film, the decrease in an amplitude of the output detection signal can be halved.

As described hereinabove, in the optical displacement measuring instrument and method, the output detection signal can provide a high amplitude, a high resolution, a large S/N (signal to noise) ratio.

Various effects can be achieved by the present invention and modifications and changes in the preferred embodiments can be made without departing from the scope of the present invention which is defined by the appended claims.

What is claimed is:

1. An instrument for optically measuring a displacement of a scale, comprising:

a) a coherent light source;

b) a transmission type diffraction grating satisfying a bragg diffraction condition;

c) first beam splitting means for receiving a light flux radiated from the light source, for transmitting a part of said light flux as a first light flux, and for reflecting the remaining part of said light flux as a second light flux, said first beam splitting means being arranged such that the first and second light fluxes are incident on said diffraction grating through approximately equal angles in their absolute values;

d) light reflecting means arranged such that both the first and second light fluxes transmitted through the diffraction grating are again incident on the diffraction grating, said light reflecting means and said diffraction grating comprising the scale;

e) second beam splitting means, arranged in a vicinity of a point at which the first and second light fluxes intersect, for combining the first and second light fluxes; and f) photo-electric transducing means for detecting an interference state of both the first and second light fluxes combined by said second beam splitting means and outputting a signal indicative of the interference state, wherein, both the first and second light fluxes pass through the diffraction grating a first and second time from a time when the light flux radiated from said coherent light source is split by the first splitting means to a time when the first and second light fluxes are combined by said second beam splitting means, light paths of the first and second light fluxes are such that one of the first and second light fluxes is transmitted through the diffraction grating the first time it passes through the diffraction grating and is diffracted through the diffraction grating in an m order (m denotes an integer of 1 or larger) the second time it passes through the diffraction grating while the other of the first and second light fluxes is diffracted through the diffraction grating in the m order the first time it passes through the diffraction grating and is transmitted through the diffraction grating the second time it passes through the diffraction grating, the light paths through which the first and second light fluxes have passed are approximately equal in length, a relationship between a grating pitch p of the diffraction grating, a wavelength λ of the coherent light, and each incident angle of the coherent light on the diffraction grating is established as 2p sinθ=n λ (n denotes an integer), the first and second light fluxes do not intersect on the diffraction grating, and light fluxes are incident on and reflected by the light reflecting means along independent light paths.

2. An instrument for optically measuring a displacement of a scale as claimed in claim 1, wherein said coherent light source comprises a semiconductor laser.

3. An instrument for optically measuring a displacement of a scale as claimed in claim 2, wherein said first and second beam splitting means comprises beam splitters.

4. An instrument for optically measuring a displacement of a scale as claimed in claim 3, wherein said diffraction grating comprises a volume type hologram.

5. An instrument for optically measuring a displacement of a scale as claimed in claim 4, wherein said light reflecting means comprises a reflecting plate approximately juxtaposed in a surface of said diffraction grating and located below the diffraction grating with respect to the coherent light source.

6. An instrument for optically measuring a displacement of a scale, comprising:

a) a coherent light source;

b) a first beam splitter arranged relative to said light source to split a light flux radiated from said light source into two light fluxes;

c) a light transmitting type diffraction grating on which the two respective light fluxes are incident through approximately mutually equal angles in their absolute values;

d) a light reflecting plate which is disposed approximately parallel to a surface of the diffraction grating so that the two respective light fluxes transmitted through the diffraction grating are again made incident on the diffraction grating, said light reflecting plate and diffraction grating comprising said scale;

e) a second beam splitter disposed in the vicinity of a point at which the two light fluxes intersect after being again passed through said diffraction grating for coupling the two light fluxes; and f) a detector which detects an interference condition of the two light fluxes coupled by said second beam splitter, wherein light paths of the two light fluxes incident on the light reflecting plate are mutually exclusive of light paths of the two light fluxes reflected from the light reflecting plate such that incident light flux and reflected light flux do not overlap in a proximity of the light source and the first and second beam splitters are disposed parallel to one another above the diffraction grating.

7. An instrument for optically measuring a displacement of a scale as claimed in claim 6, wherein:

each of the two light fluxes pass through the diffraction grating a first and second time prior to being coupled by the second beam splitter;

a light path of one of the two light fluxes is transmitted through the diffraction grating the first time it passes through said diffraction grating and is diffracted through the diffraction grating the second time it passes through said diffraction grating in an m order (m denotes an integer of 1 or larger;

a light path of the other of the two light fluxes is diffracted through the diffraction grating the first time it passes through said diffraction grating in the m order and is transmitted through the diffraction grating the second time it passes through said diffraction grating;

the two light fluxes have approximately equal light path lengths;

a relationship between a grating pitch p and a wavelength $\lambda$ of the coherent light, and an incident angle $\theta$ of the coherent light to the diffraction grating is given as $2p\sin\theta = n\lambda$ (n denotes an integer).

8. An instrument for optically measuring a displacement of a scale as claimed in claim 6, wherein said scale further comprises a glass substrate which is disposed approximately parallel to a grating surface of the diffraction grating and adhered to said diffraction grating, a rear surface of the glass substrate being treated with a reflection film serving as the reflecting plate.

9. An instrument for optically measuring a displacement of a scale as claimed in claim 6, wherein said reflecting plate is a reflecting film formed on a rear surface of a substrate of the diffraction grating.

10. An instrument for optically measuring a displacement of a scale as claimed in claim 6, further comprising a third beam splitter which combines additional portions of the two light fluxes, said third beam splitter being disposed such that both of said second and third beam splitters are spaced apart from each other at an equal distance toward left and right directions with the first beam splitter as a center.

11. An instrument for optically measuring a displacement of a scale as claimed in claim 6, wherein said first beam splitter and second beam splitter are integrally constituted by a prism.

12. An instrument for optically measuring a displacement of a scale as claimed in claim 6, wherein said diffraction grating comprises a volume type hologram in which the grating vector direction is approximately coincident with a measurement direction of the scale.

13. A method for optically measuring a displacement of a scale, comprising the steps of:

a) radiating a coherent light;

b) providing a transmitting type diffraction grating and light reflecting means comprising the scale; and c) detecting an interference state of light fluxes passed through the diffraction grating at their intersecting point, wherein the light flux of the coherent light is split into two light fluxes, both light fluxes having passed through said diffraction grating a first and second time, respectively, one of the light fluxes being incident and transmitted through the diffraction grating at the first time and being incident and diffracted at the second time in an m order (m denotes an integer of 1 or larger) and the other light flux being incident and diffracted in the m order through said diffraction grating at the first time and being incident and transmitted through the diffraction grating at the second time, the two light fluxes having approximately the same light path lengths, a relationship between a grating pitch p of the diffraction grating, a wavelength $\lambda$ of the coherent light, and each incident angle $\theta$ of the coherent light on the diffraction grating is established as $2p \sin\theta = n \lambda$ (n denotes an integer), an intersecting point of both light fluxes is not present on the diffraction grating, and light flux is incident on and reflected by the light reflecting means along independent light paths.

* * * * *